United States Patent
Zhang (10) Patent No.: US 10,664,436 B2
(45) Date of Patent: May 26, 2020

(54) APPLICATION ACCELERATION METHOD AND APPLICATION ACCELERATION DEVICE

(71) Applicant: TENCENT TECHNOLOGY (SHENZHEN) COMPANY LIMITED, Shenzhen, Guangdong (CN)

(72) Inventor: Xiong Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/782,435

(22) Filed: Oct. 12, 2017

(65) Prior Publication Data

US 2018/0032473 A1 Feb. 1, 2018

Related U.S. Application Data

(63) Continuation of application No. PCT/CN2016/093955, filed on Aug. 8, 2016.

(30) Foreign Application Priority Data

Sep. 9, 2015 (CN) .......................... 2015 1 0571980

(51) Int. Cl.
*G06F 9/54* (2006.01)
*G06F 15/173* (2006.01)
(Continued)

(52) U.S. Cl.
CPC ........ *G06F 15/17306* (2013.01); *G06F 9/445* (2013.01); *G06F 9/54* (2013.01);
(Continued)

(58) Field of Classification Search
None
See application file for complete search history.

(56) References Cited

U.S. PATENT DOCUMENTS

2002/0013633 A1 1/2002 Kodama
2002/0118220 A1* 8/2002 Lui .......................... G06F 9/453
715/709
(Continued)

FOREIGN PATENT DOCUMENTS

CN 103049628 A 4/2013
CN 104077184 A 10/2014
(Continued)

OTHER PUBLICATIONS

Office Action with Translation Issued for Korean Patent Application No. 10-2017-7033385 dated Oct. 22, 2018.
(Continued)

*Primary Examiner* — Shih-Wei Kraft
(74) *Attorney, Agent, or Firm* — Anova Law Group, PLLC (57) ABSTRACT

Provided are an application acceleration method and an application acceleration device. The application acceleration method includes invoking, by a control center, a process monitoring class to monitor start and end of a process. Process information on a process sent by the process monitoring class is received after the process monitoring class monitors that the process is started and confirms that the process requires to be accelerated. A service class is invoked based on the process information, where the service class monitors multiple states of the process, and executes a task in each of the multiple states of the process until the process is in an end state.

7 Claims, 4 Drawing Sheets

(51) Int. Cl.
  *G06F 11/30* (2006.01)
  *G06F 9/445* (2018.01)
  *G06F 21/54* (2013.01)

(52) U.S. Cl.
  CPC .............. *G06F 9/546* (2013.01); *G06F 11/30* (2013.01); *G06F 15/17337* (2013.01); *G06F 21/54* (2013.01)

(56) References Cited

U.S. PATENT DOCUMENTS

| | | | | |
|---|---|---|---|---|
| 2005/0289505 | A1* | 12/2005 | Williams | G06F 9/485 717/103 |
| 2006/0195840 | A1* | 8/2006 | Sundarrajan | G06F 8/61 717/176 |
| 2013/0232331 | A1* | 9/2013 | Farhan | G06F 11/3006 713/100 |
| 2013/0290934 | A1* | 10/2013 | Simon | G06F 11/3636 717/125 |
| 2013/0338993 | A1* | 12/2013 | Zhong | G06F 9/455 703/23 |
| 2015/0113544 | A1 | 4/2015 | Yu | |
| 2015/0220730 | A1 | 8/2015 | Chen | |

FOREIGN PATENT DOCUMENTS

| | | |
|---|---|---|
| CN | 104134034 A | 11/2014 |
| CN | 104866335 A | 8/2015 |
| JP | 2002041285 A | 2/2002 |
| JP | 2010234114 A | 10/2010 |
| JP | 2010238114 A | 10/2010 |
| KR | 10-2007-0092720 A | 9/2007 |
| KR | 10-2008-0110894 A | 12/2008 |

OTHER PUBLICATIONS

Office Action with Translation Issued for Japanese Application No. 2017-560727 dated Jan. 28, 2019.

\* cited by examiner

APPLICATION ACCELERATION METHOD AND APPLICATION ACCELERATION DEVICE

The present application is a continuation of International Patent Application No. PCT/CN2016/093955, filed on Aug. 8, 2016, which claims priority to Chinese Patent Application No. 201510571980.5, titled "APPLICATION ACCELERATION METHOD AND APPLICATION ACCELERATION DEVICE" and filed with the Chinese State Intellectual Property Office on Sep. 9, 2015, both of which are incorporated herein by reference in their entireties for all purposes.

TECHNICAL FIELD

The present disclosure relates to the technical field of computers, and particularly to an application acceleration method and an application acceleration device.

BACKGROUND

The application acceleration relates to software which may increase a speed of an application.

Much software such as Tencent PC manager has an application acceleration function. For example, the Tencent PC manager performs starting acceleration for a game and application software with a combination of the C++ language and the lua (an embedded scripting language) engine. In this case, every time game support or application support is added, the program codes require to be changed, and a class is added to package support for the lua script. In addition, due to independence of data of the lua engine, the data cannot be shared. Therefore, operation efficiency and maintenance efficiency of the above application acceleration solution are low.

SUMMARY

An application acceleration method and an application acceleration device are provided according to the embodiments of the present disclosure, to realize data sharing and improve the operation efficiency and the maintenance efficiency.

An application acceleration method includes:

invoking, by a control center, a process monitoring class to monitor start and end of a process;

receiving, by the control center, process information on a process sent by the process monitoring class after the process monitoring class monitors that the process is started and confirms that the process requires to be accelerated; and invoking, by the control center, a service class based on the process information, where the service class monitors multiple states of the process, and executes a task in each of the multiple states of the process until the process is in an end state.

An application acceleration device includes:

a monitoring invoking unit configured to invoke a process monitoring class to monitor start and end of a process;

a first receiving unit configured to receive process information on a process sent by the process monitoring class after the process monitoring class monitors that the process is started and confirms that the process requires to be accelerated; and a service invoking unit configured to invoke a service class based on the process information, where the service class monitors multiple states of the process, and executes a task in each of the multiple states of the process until the process is in an end state.

BRIEF DESCRIPTION OF THE DRAWINGS

In order to more clearly illustrate technical solutions of the embodiments of the present disclosure, drawings to be used in the description of the embodiments are briefly described below. The drawings in the following description show only some embodiments of the present disclosure, and other drawings may be obtained by those skilled in the art according to the drawings provided herein and fall within the disclosure.

DETAILED DESCRIPTION OF THE EMBODIMENTS

In order to make the purpose, technical solutions and the advantages of the present disclosure clearer, in the following, the present disclosure will be described further in detail in conjunction with the drawings. Apparently, the described embodiments are only a part of embodiments of the present disclosure, rather than all the embodiments. Other embodiments obtained by those skilled in the art based on these embodiments of the present disclosure fall within the protection scope of the present disclosure.

Figure 1:
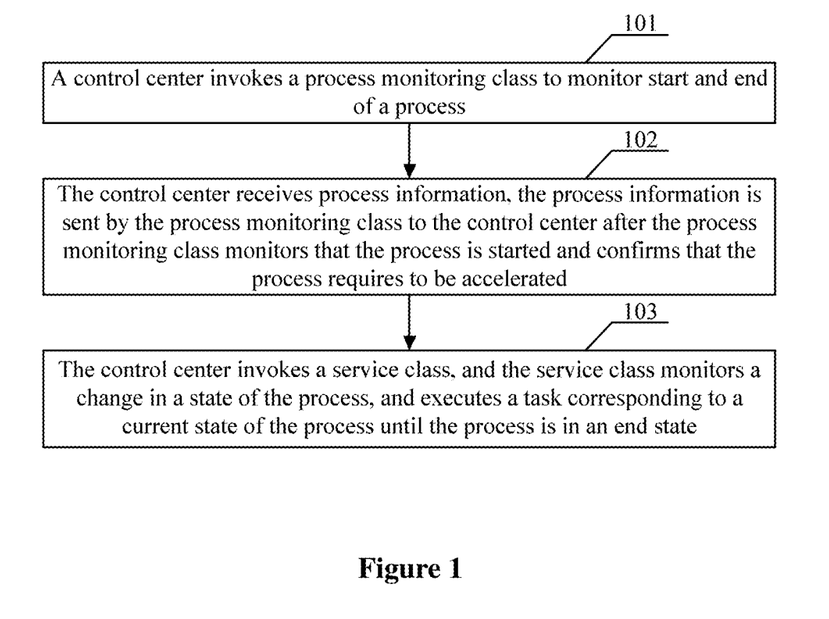
FIG. 1 is a schematic flowchart of a method according to an embodiment of the present disclosure.

An application acceleration method is provided according to an embodiment of the present disclosure, as shown in FIG. 1, the application acceleration method includes blocks 101 to 103.

In block 101, a control center invokes a process monitoring class to monitor start and end of a process.

In the embodiment of the present disclosure, the control center provides a function for scheduling application acceleration, and may provide an external interface of software having an acceleration function. The control center invokes the process monitoring class. The process monitoring class belongs to a software concept, and may monitor start and end of the process in a device. Regarding to how to trigger the control center to invoke the process monitoring class, a scheme as follows is provided in the embodiment of the present disclosure.

Before the control center invokes the process monitoring class to monitor the start and the end of the process, the application acceleration method above further includes:

exposing, by the control center, an initialization interface and a deinitialization interface through a dynamic link library; and invoking, by the control center, the process monitoring class to monitor the start and the end of the process, after the initialization interface is invoked.

A function of the process monitoring class is monitoring the start and the end of the process in the device, and specific implementation of the function may refer to definition for the class having the function, which is not described repeatedly here.

In block 102, the control center receives process information on a process sent by the process monitoring class after the process monitoring class monitors that the process is started and confirms that the process requires to be accelerated.

In the embodiment of the present disclosure, the process monitoring class has a function of screening a process, this is because not all the processes require to be accelerated, and not all the processes can be accelerated. Only when there is a process which requires to be accelerated, a logic of acceleration is invoked. Of course, the process should be a process capable of being accelerated. The embodiment also provides a process screening logic, and the specific implementation of a flow of the process screening logic is described as follows: after the process monitoring class monitors that the process is started, determining whether the above process hits a configured process; and in a case of determining that the above process hits the configured process, triggering a callback interface to send the process information to the control center.

In the embodiment of the present disclosure, the hitting indicates that the monitored process belongs to the configured process, that is, a process which requires to be accelerated and can be accelerated. Generally, a process name is used to be matched in a process file, and a successful matching indicates the hitting.

In block 103, the control center invokes a service class based on the process information, and the service class monitors multiple states of the process, and executes a task in each of the states of the process until the process is in an end state.

The service class is a function class used to maintain the states of the process and control execution of the tasks of the process. The tasks of the process in the embodiment refer to contents executed by the process to realize the function of the process, and the tasks may be usually generated by a class factory, and may be reused and shared.

In the embodiment of the present disclosure, the control center controls an acceleration procedure, and the process monitoring class monitors the process which requires to be accelerated. A state of the process changes from the start to the end, tasks are executed in each of the states of the process, and the execution of the tasks is controlled by the service class. As long as configuration data in the service class can support acceleration for the process, application acceleration can be realized. Moreover, the tasks in a procedure of executing the process can be reused and shared by different processes without modifying codes. Therefore, the acceleration solution adopted in the embodiments of the present disclosure can improve operation efficiency and maintenance efficiency.

Furthermore, an implementation solution executed after the acceleration for the process is completed is further provided according to the embodiments of the present disclosure. After the service class monitors that the process is in the end state, the above application acceleration method further includes:

receiving, by the control center, information indicating that the acceleration for the above process is completed from the service class; and invoking, by the control center, the process monitoring class to monitor start and end of a process.

Since the service class knows a current state of the process, in a case that the execution of the process is completed and the process is in the end state, corresponding information may be fed back to the control center, and the control center controls to monitor a next process. The acceleration for the processes operated by the device can be completed automatically in cycles.

In the embodiment of the present disclosure, in theory, the service class can realize the above functions by only acquiring a correspondence among a process, a state and a task. Different configuration files may record different processes. One configuration file may be used to record multiple processes. The configuration file configured with information on the correspondence among a process, a state and a task is stored in the above service class.

In this embodiment, the configuration file may include multiple processes. In the following embodiments, a first process and a second process are only examples of processes in the configuration file. The first process or the second process may be the process which requires to be accelerated described above, or may not be the process which requires to be accelerated described above, which is not limited in the embodiment of the disclosure.

The configuration file described above includes at least two processes, that is, the first process and the second process.

In the configuration file described above, the first process described above corresponds to all states of the first process from the start of execution of the first process to the end of the first process, and corresponds to a task to be executed in each of the states of the first process. One or more tasks are executed in each state.

The embodiment of the present disclosure further provides an alternative scheme example of an execution result for the task and a type of the task. The execution result for the task described above includes success or failure, and the type of the task described above includes at least one of condition triggering, condition judgment and an action.

In the embodiment of the present disclosure, a universal acceleration platform is built with considering the convenience of starting acceleration support for the application and the extensibility for subsequent capability enhancement (which is not limited to start acceleration). Therefore, the universal acceleration platform is built using a workflow engine (module) according to the principle of finite state machine in the embodiment of the present disclosure, to support starting acceleration of most applications. In this case, it is not limited to acceleration for a particular application and an application in a particular state.

Figure 2:
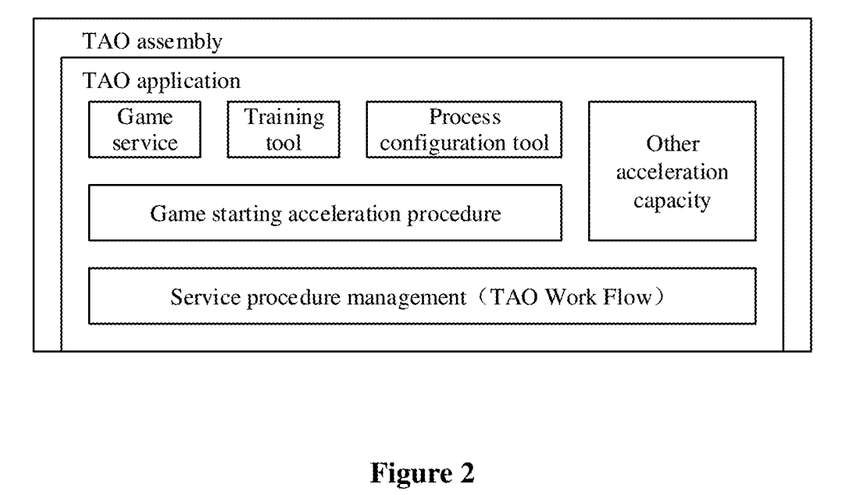
FIG. 2 is a schematic structural diagram of software according to an embodiment of the present disclosure.

As shown in FIG. 2, game starting acceleration in TAO is taken as an example. In a structure shown in FIG. 2, a workflow module is located in service procedure management (TAO Work Flow) part. The structure shown in FIG. 2 includes a TAO assembly, a TAO application, a game service, a training tool, a procedure configuration tool, a game staring acceleration procedure and the service procedure management. Additionally, other acceleration capacity can be extended based on the service procedure management, which is not illustrated in FIG. 2. The service procedure management is located in a core part of the application layer (a next layer is used to drive to provide the acceleration capacity), and is used to uniformly establish and manage a whole application acceleration procedure, a specific implementation architecture is shown FIG. 3, which is a schematic structural diagram of a class of database modelling. The class belongs to a programming term, and includes a data member and a member function. The data member corresponds to a property of the class, and the data member of the class may also be a data type, which does not require storage allocation. The member function is used to operate the property of the class, and is a particular operation of the class. An operation of an interaction between the class and the outside is called as the interface. The member function may be realized inside or outside the class "inline" is added acquiescently to the member function realized inside the class, and a domain operator must be added to the member function realized outside the class, i.e., "class name::member function". The class shown in FIG. 3 may be interpreted with reference to the basic definitions of the class.

Figure 3:
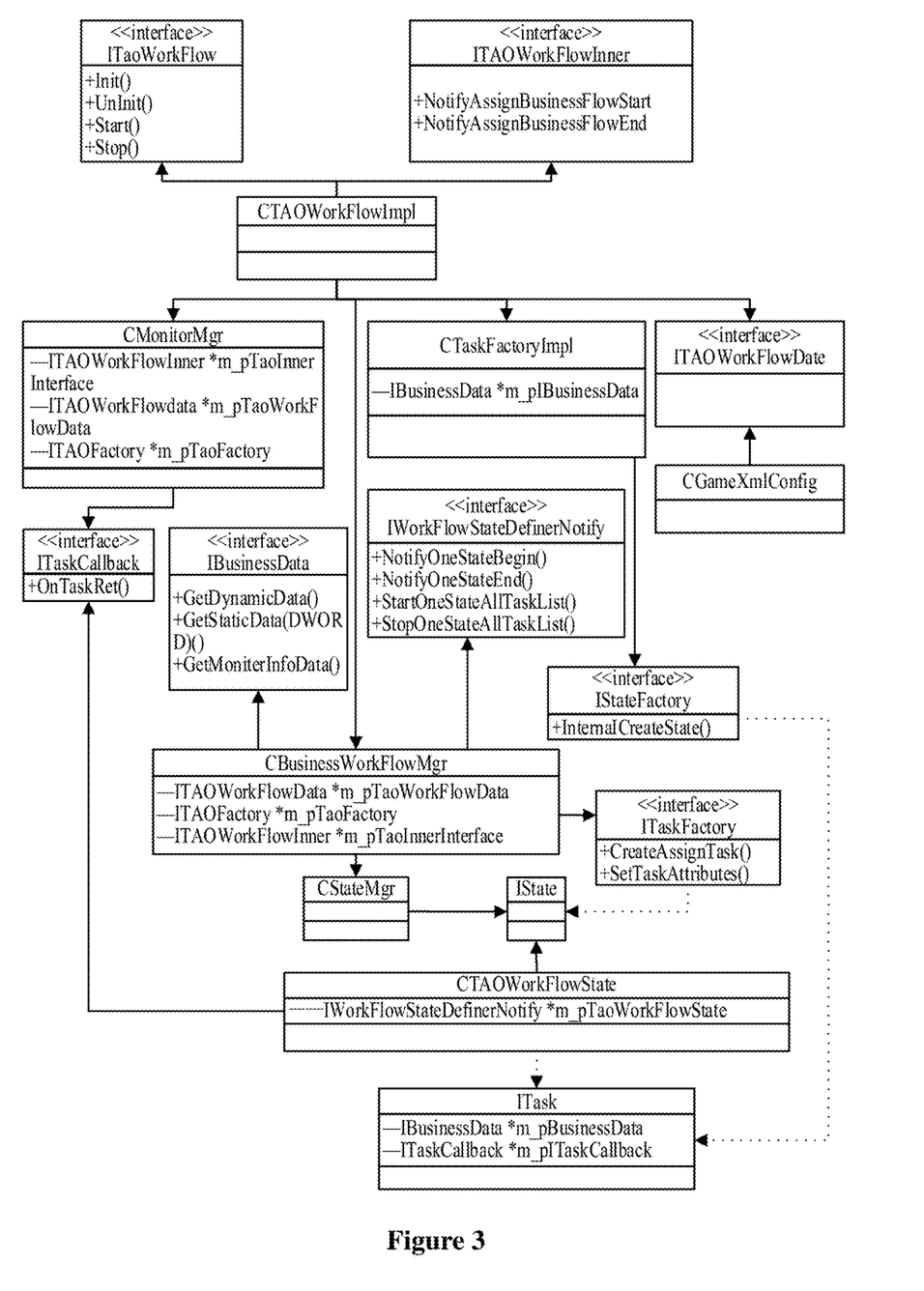
FIG. 3 is a schematic structural diagram of database modelling according to an embodiment of the present disclosure.

The classes in FIG. 3 are illustrated below by way of example.

TABLE 1

| <<interface>><br>ITaoWorkFlow |
|---|
| +Init( )<br>+UnInit( )<br>+Start( )<br>+Stop( ) |

The above Table 1 includes an interface name ITaoWorkFlow (ITAO workflow) and a defined interface name including Init (initialization) and UnInit (Deinitialization), Start (start), Stop (stop), which are the interfaces exposed through a whole Dynamic Link Library (DLL).

TABLE 2

| <<interface>><br>ITAOWorkFlowInner |
|---|
| +NotifyAssignBusinessFlowStart<br>+NotifyAssignBusinessFlowEnd |

The above Table 2 includes an interface name ITAOWorkFlowInner (inner workflow) and two interfaces including NotifyAssignBusinessFlowStart (notifying of starting to assign business) and NotifyAssignBusinessFlowEnd (notifying of ending assigning business).

The contents recoded in Table 1 and Table 2 are a class of the interfaces provided by the class CTAOWorkFlowImpl as the control center, and a class for the initialization and starting acceleration flow, respectively.

TABLE 3

| CMonitorMgr |
|---|
| —ITAOWorkFlowInner*m_pTaoInnerInterface<br>—ITAOWorkFlowdata*m_pTaoWorkFlowData<br>—ITAOFactory*m_pTaoFactory |

In the above Table 3, CMonitorMgr is a management class for monitoring a process, an inner workflow, data of the workflow and a class factory which the class belongs to are monitored through ITAOWorkFlowInner*m_pTaoInnerInterface, ITAOWorkFlowdata*m_pTaoWorkFlowData and ITAOFactory*m_pTaoFactory defined in the CMonitorMgr, respectively, to monitor the process.

TABLE 4

| CTaskFactoryImpl |
|---|
| —IBusinessData*m_pIBusinessData |

In the above Table 4, CTaskFactoryImpl is a class which defines a task, in which, IBusinessData is a function for invoking service data.

TABLE 5

| <<interface>><br>ITAOWorkFlowDate |
|---|

In the above Table 5, ITAOWorkFlowDate is a class for defining an interface of the ITAO workflow.

Based on the class for the interface of the workflow and the definition of CGameXmlConfig class as an example in the embodiment, a class of game configuration is defined.

TABLE 6

| <<interface>><br>ITaskCallback |
|---|
| +OnTaskRet( ) |

In the above Table 6, an interface class ITaskCallback is defined for callback, in which, a member function OnTaskRet is used to realize task callback.

TABLE 7

| <<interface>><br>IBusinessData |
|---|
| +GetDynamicData( )<br>+GetStaticData(DWORD)( )<br>+GetMoniterInfoData( ) |

The above Table 7 shows a class for defining an interface, and IBusinessData is service data on a class name, in which, +GetDynamicData( )+GetStaticData(DWORD)( )+GetMoniterInfoData( ) are member functions used to acquire dynamic data, obtain static data and acquire monitoring information data, respectively.

TABLE 8

| <<interface>><br>IWorkFlowStateDefinerNotify |
|---|
| +NotifyOneStateBegin( ) - notifying the start of one state<br>+NotifyOneStateEnd( ) - notifying the end of the one state<br>+StartOneStateAllTaskList( ) - starting all task lists in one state<br>+StopOneStateAllTaskList( ) - stopping all task lists in one state |

The above Table 8 shows a class for defining an interface, the class has a class name IWorkFlowStateDefinerNotify indicating that the interface is the class for defining a state of the workflow, and member functions+NotifyOneStateBegin( ), +NotifyOneStateEnd( ), +StartOneStateAllTaskList( ), +StopOneStateAllTaskList( ) of the class are used to realize notifying the start of one state, notifying the end of one state, starting all task lists in one state and stopping all task lists in one state, respectively.

TABLE 9

| <<interface>> |
| --- |
| IStateFactory |
| +InternalCreateState( ) - establishing an internal state |

The above Table 9 shows a class defining an interface, the class has a class name IStateFactory indicating that the interface is the class for defining a class factory of the states, and the member function+InternalCreateState( ) of the class is used to realize establishing an internal state.

TABLE 10

| CBusinessWorkFlowMgr |
| --- |
| —ITAOWorkFlowData*m_pTaoWorkFlowData |
| —ITAOFactory*m_pTaoFactory |
| —ITAOWorkFlowInner*m_pTaoInnerInterface |

The above Table 10 includes a class name CBusinessWorkFlowMgr indicating that a class is used to define the service procedure management, and the member function ITAOWorkFlowData*m_pTaoWorkFlowData, ITAOFactory*m_pTaoFactory, ITAOWorkFlowInner*m_pTaoInnerInterface of the class are used to realize invoking workflow data, a workflow class factory and an internal workflow, respectively.

TABLE 11

| <<interface>> |
| --- |
| ITaskFactory |
| +CreateAssignTask( ) - creating assinging task |
| +SetTaskAttributes( ) - setting task attributes |

The above Table 11 shows a class for defining an interface, the class has a class name ITaskFactory indicating a task of the class factory, the member function+CreateAssignTask( ), +SetTaskAttributes( ) of the class are used to realize creating assigning task and setting task attributes, respectively.

The class CStateMgr of task management and the class IState of a specific task may be set based on the above Table 10.

TABLE 12

| CTAOWorkFlowState |
| --- |
| —IWorkFlowStateDefinerNotify*m_pTaoWorkFlowState - notifying definition for the state of the workflow |

The class name in above Table 12 is CTAOWorkFlowState indicating that the class is used to define a task workflow, and the member function IWorkFlowStateDefinerNotify*m_pTaoWorkFlowState of the class is used to realize notifying definition for the state of the workflow.

TABLE 13

| ITask |
| --- |
| —IBusinessData*m_pBusinessData |
| —ITaskCallback*m_pITaskCallback |

The class name in the above Table 13 is ITask indicating that the class is used to define the task, and the member functions IBusinessData*m_pBusinessData, ITaskCallback*m_pITaskCallback of the class are used to realize invoking the service data and returning the task invoking, respectively.

A solid arrow in FIG. 3 represents a dependent relationship among the classes.

An implementation procedure of the embodiment of the present disclosure is described below based on a result of the database modelling shown in FIG. 3. CTAOWorkFlowImpl is the control center which provides interfaces, such as Init and UnInit, the workflow module may be initialized and deinitialized through the two interfaces after obtaining pointers of the above interfaces. A whole acceleration procedure is started with the start interface provided.

The member class CMonitorMgr of CTAOWorkFlowImpl is the management class for monitoring a process. Before the acceleration procedure is triggered, the start and the end of the game process are monitored first, the callback interface of CMonitorMgr is triggered once the start of the game process which hits a configured game is monitored, which is notified to the control center CTAOWorkFlowImpl. In this case, the method of another member class CBusinessWorkMgr is invoked. In the member class CBusinessWorkMgr, a state machine is configured to maintain inside, and there are multiple states in a configuration file. One or more configured tasks i.e., the ITask interface in FIG. 3 are executed in each state. The process switches between the states based on execution results of the tasks in the configuration file until the process is in the end state (1000 by convention).

The tasks are produced by the class factory and can be reused, and the results of the tasks may be success or failure typically. The tasks may be divided into different types such as Trigger (triggering under certain conditions, such as timing or message driving), Condition (condition judgment, such as whether a memory meets a requirement, whether a type of a hard disk is correct), Act (actions, such as starting pre fetch, stopping pre fetch) and the like.

After CBusinessWorkMgr completes the execution of the procedure, the control center is informed to start next monitoring, in this way, the acceleration procedure is started for the configured games in cycles. In the embodiment, different games may correspond to different configuration files. In the embodiment, different acceleration procedures are provided based on the switch between states of the configuration files. The technical solution adopted in the embodiment of present disclosure only requires supporting of the configuration files, and can provide acceleration capacity to most applications.

Figure 4:
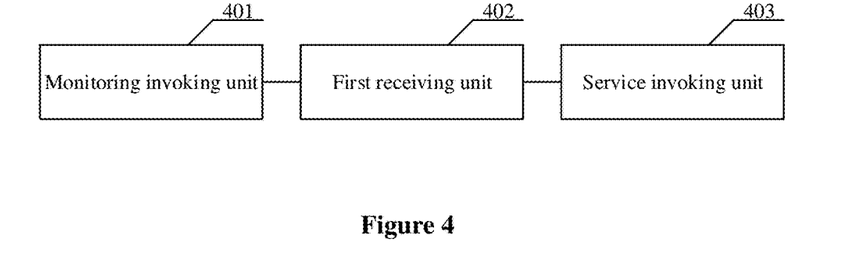
FIG. 4 is a schematic structural diagram of a device according to an embodiment of the present disclosure.

An application acceleration device is further provided in the embodiments of the present disclosure, as shown in FIG. 4, the application acceleration device includes a monitoring invoking unit 401, a first receiving unit 402 and a service invoking unit 403.

The monitoring invoking unit 401 is configured to invoke a process monitoring class to monitor start and end of a process.

The first receiving unit 402 is configured to receive process information on a process sent by the process monitoring class after the process monitoring class monitors that the process is started and confirms that the process requires to be accelerated.

The service invoking unit 403 is configured to invoke a service class based on the process information, where the service class monitors multiple states of the process, and executes a task in each of the multiple states of the process until the process is in an end state.

The service class is a function class used to maintain the states of the process and control execution of the tasks of the process. The tasks of the process in the embodiment refer to contents executed by the process to realize the function of the process, and the tasks may be usually generated by a class factory, and may be reused and shared.

In the embodiment of the present disclosure, the control center controls an acceleration procedure, and the process monitoring class monitors the process which requires to be accelerated. A state of the process changes from the start to the end, tasks are executed in each of the states of the process, and the execution of the tasks is controlled by the service class. As long as configuration data in the service class can support acceleration for the process, application acceleration can be realized. Moreover, the tasks in a procedure of executing the process can be reused and shared by different processes without modifying codes. Therefore, the acceleration solution adopted in the embodiments of the present disclosure can improve operation efficiency and maintenance efficiency.

Figure 5:
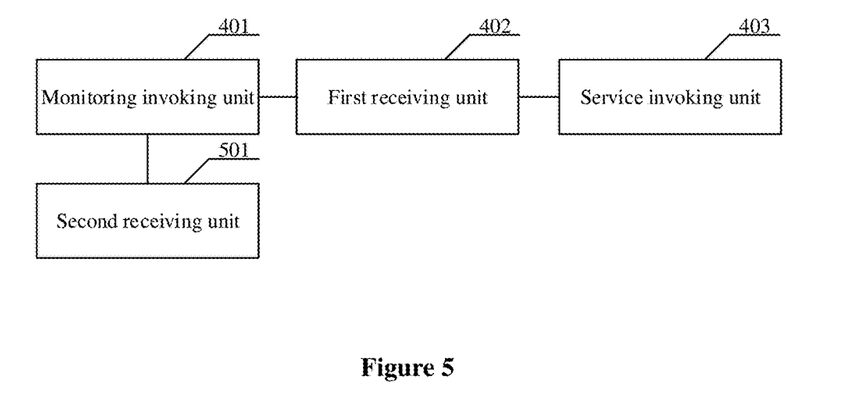
FIG. 5 is a schematic structural diagram of a device according to an embodiment of the present disclosure.

Furthermore, an implementation solution executed after the acceleration for the process is completed is further provided according to the embodiment of the present disclosure. As shown in FIG. 5, the above application acceleration device further includes a second receiving unit 501.

The second receiving unit 501 is configured to receive information indicating that acceleration for the process is completed from the service class after the service class monitors that the process is in the end state.

The monitoring invoking unit 401 is further configured to invoke the process monitoring class to monitor start and end of a process after the second receiving unit receives the information indicating that the acceleration for the process is completed.

Since the service class knows a current state of the process, in a case that the execution of the process is completed and the process is in the end state, corresponding information may be fed back to the control center, and the control center controls to monitor a next process. The acceleration for the processes operated by the device can be completed automatically in cycles.

In the embodiment of the present disclosure, the process monitoring class has a function of screening a process, this is because not all the processes require to be accelerated, and not all the processes can be accelerated. Only when there is a process which requires to be accelerated, a logic of acceleration is invoked. Of course, the process should be a process capable of being accelerated. The embodiment also provides a process screening logic, and the specific implementation of a flow of the process screening logic is described as follows: after the process monitoring class monitors that the process is started, determining whether the above process hits a configured process; and in a case of determining that the above process hits the configured process, triggering a callback interface to send the process information to the control center.

In the embodiment of the present disclosure, the hitting indicates that the monitored process belongs to the configured process, that is, a process which requires to be accelerated and can be accelerated. Generally, a process name is used to be matched in a process file, and a successful matching indicates the hitting.

Figure 6:
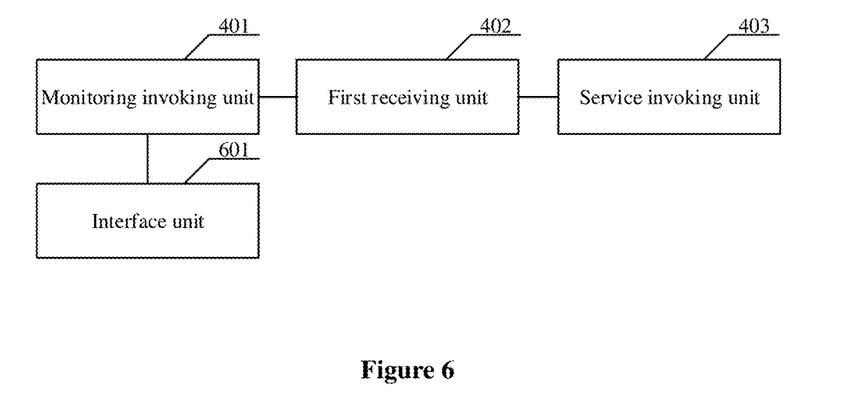
FIG. 6 is a schematic structural diagram of a device according to an embodiment of the present disclosure.

In the embodiment of the present disclosure, the control center provides a function for scheduling application acceleration, and may provide an external interface of software having an acceleration function. The control center invokes the process monitoring class. The process monitoring class belongs to a software concept, and may monitor start and end of the process in a device. Regarding to how to trigger the control center to invoke the process monitoring class, a scheme as follows is provided in the embodiment of the present disclosure. As shown in FIG. 6, the above application acceleration device further includes an interface unit 601.

The interface unit 601 is configured to expose an initialization interface and a deinitialization interface through a dynamic link library.

The monitoring invoking unit 401 is further configured to invoke the process monitoring class to monitor the start and the end of the process after the initialization interface is invoked.

A function of the process monitoring class is monitoring the start and the end of the process in the device, and specific implementation of the function may refer to definition for the class having the function, which is not described repeatedly here.

In the embodiment of the present disclosure, in theory, the service class can realize the above functions by only acquiring a correspondence among a process, a state and a task. Different configuration files may record different processes. One configuration file may be used to record multiple processes. The configuration file configured with information on the correspondence among a process, a state and a task is stored in the above service class.

In this embodiment, the configuration file may include multiple processes. In the following embodiments, a first process and a second process are only examples of processes in the configuration file. The first process or the second process may be the process which requires to be accelerated described above, or may not be the process which requires to be accelerated described above, which is not limited in the embodiment of the disclosure.

The configuration file described above includes at least two processes, that is, the first process and the second process.

In the configuration file described above, the first process described above corresponds to all states of the first process from the start of execution of the first process to the end of the first process, and corresponds to a task to be executed in each of the states of the first process. One or more tasks are executed in each state.

The embodiment of the present disclosure further provides an alternative scheme example of an execution result for the task and a type of the task. The execution result for the task described above includes success or failure, and the type of the task described above includes at least one of condition triggering, condition judgment and an action.

Figure 7:
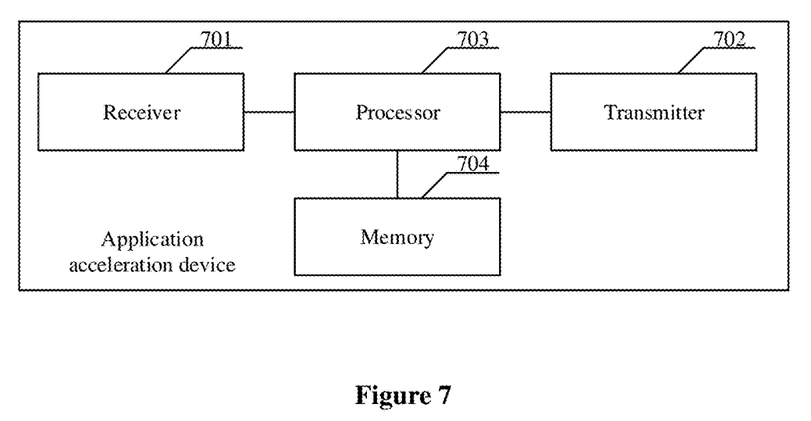
FIG. 7 is a schematic structural diagram of a device according to an embodiment of the present disclosure.

Another application acceleration device is further provided according to the embodiments of the present disclosure, as shown in FIG. 7, the application acceleration device includes a receiver 701, a transmitter 702, a processor 703 and a memory 704.

The memory 704 is configured to provide a function of data storage, and includes a cache for data processing by the processor 703 and/or a permanent storage for reading data in processing. The receiver 701 and the transmitter 702 may not be involved in the embodiment of the present disclosure, which depends on whether the application to be accelerated requires the receiver 701 and the transmitter 702.

The processor 703 is configured to execute operations of: invoking a process monitoring class to monitor start and end of a process by a control center; receiving, by the control center, process information, where the process information is sent to the control center in a case that the above process monitoring class monitors that the process is started and confirms that the process above requires to be accelerated; invoking, by the control center, a service class based on the process information, where the service class monitors multiple states of the above process, and executes a task in each of the states of the process until the process is in an end state.

The service class is a function class used to maintain the states of the process and control execution of the tasks of the process. The tasks of the process in the embodiment refer to contents executed by the process to realize the function of the process, and the tasks may be usually generated by a class factory, and may be reused and shared.

In the embodiment of the present disclosure, the control center controls an acceleration procedure, and the process monitoring class monitors the process which requires to be accelerated. A state of the process changes from the start to the end, tasks are executed in each of the states of the process, and the execution of the tasks is controlled by the service class. As long as configuration data in the service class can support acceleration for the process, application acceleration can be realized. Moreover, the tasks in a procedure of executing the process can be reused and shared by different processes without modifying codes. Therefore, the acceleration solution adopted in the embodiments of the present disclosure can improve operation efficiency and maintenance efficiency.

In the embodiment of the present disclosure, the control center provides a function for scheduling application acceleration, and may provide an external interface of software having an acceleration function. The control center invokes the process monitoring class. The process monitoring class belongs to a software concept, and may monitor start and end of the process in a device. Regarding to how to trigger the control center to invoke the process monitoring class, a scheme as follows is provided in the embodiment of the present disclosure.

The above processor 703 is further configured to execute the operations of exposing, by the control center, an initialization interface and a deinitialization interface through a dynamic link library before the control center invokes the process monitoring class to monitor the start and the end of the process; and invoking, by the control center, the process monitoring class to monitor the start and the end of the process after the initialization interface is invoked.

A function of the process monitoring class is monitoring the start and the end of the process in the device, and specific implementation of the function may refer to definition for the class having the function, which is not described repeatedly here.

In the embodiment of the present disclosure, the process monitoring class has a function of screening a process, this is because not all the processes require to be accelerated, and not all the processes can be accelerated. Only when there is a process which requires to be accelerated, a logic of acceleration is invoked. Of course, the process should be a process capable of being accelerated. The embodiment also provides a process screening logic, and the specific implementation of a flow of the process screening logic is described as follows: after the process monitoring class monitors that the process is started, determining whether the above process hits a configured process; and in a case of determining that the above process hits the configured process, triggering a callback interface to send the process information to the control center.

In the embodiment of the present disclosure, the hitting indicates that the monitored process belongs to the configured process, that is, a process which requires to be accelerated and can be accelerated. Generally, a process name is used to be matched in a process file, and a successful matching indicates the hitting.

Furthermore, an implementation solution executed after the acceleration for the process is completed is further provided according to the embodiments of the present disclosure. The above processor 703 is further configured to execute the operation of: receiving, by the above control center, information indicating that the acceleration for the above process is completed from the above service class after the service class monitors that the process is in the end state; and invoking, by the control center, the process monitoring class to monitor start and end of a process.

Since the service class knows a current state of the process, in a case that the execution of the process is completed and the process is in the end state, corresponding information may be fed back to the control center, and the control center controls to monitor a next process. The acceleration for the processes operated by the device can be completed automatically in cycles.

In the embodiment of the present disclosure, in theory, the service class can realize the above functions by only acquiring a correspondence among a process, a state and a task. Different configuration files may record different processes. One configuration file may be used to record multiple processes. The configuration file configured with information on the correspondence among a process, a state and a task is stored in the above service class.

In this embodiment, the configuration file may include multiple processes. In the following embodiments, a first process and a second process are only examples of processes in the configuration file. The first process or the second process may be the process which requires to be accelerated described above, or may not be the process which requires to be accelerated described above, which is not limited in the embodiment of the disclosure.

The configuration file described above includes at least two processes, that is, the first process and the second process.

In the configuration file described above, the first process described above corresponds to all states of the first process from the start of execution of the first process to the end of the first process, and corresponds to a task to be executed in each of the states of the first process. One or more tasks are executed in each state.

The embodiment of the present disclosure further provides an alternative scheme example of an execution result for the task and a type of the task. The execution result for the task described above includes success or failure, and the type of the task described above includes at least one of condition triggering, condition judgment and an action.

Figure 8:
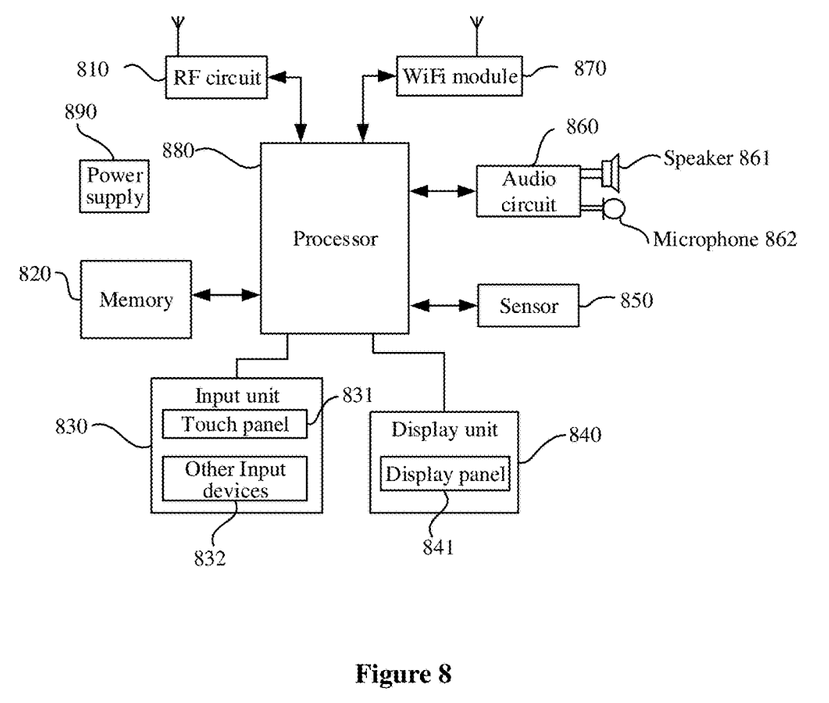
FIG. 8 is a schematic structural diagram of a device according to an embodiment of the present disclosure.

Another application acceleration device is provided in the embodiments of the present disclosure. As illustrated in FIG. 8, for the convenience of illustration, only the parts related to the embodiment of the present disclosure are shown, and the specific technical details not illustrated here may refer to the method according to the embodiment of the present disclosure. A terminal may be a cell phone, a tablet, a Personal Digital Assistant (PDA), a Point of Sales (POS), an on-board computer and any terminal device, and the cell phone is taken as an example of the terminal.

FIG. 8 is a partial structural block diagram of the cell phone related to the terminal according to the embodiments of the present disclosure. Referring to FIG. 8, the cell phone includes a radio frequency (RF) circuit 810, a memory 820, an input unit 830, a display unit 840, a sensor 850, an audio circuit 860, a wireless fidelity (WiFi) module 870, a processor 880 and a power supply 890 and the other components. It can be understood by those skilled in the art that the cell phone is not limited to have the structure shown in FIG. 8, the cell phone may include more or less components than those shown in FIG. 8, or may include a combination of some components, or components with a different arrangement.

The components of the cell phone are described in detail hereinafter in conjunction with FIG. 8.

The RF circuit 810 may be configured to receive and transmit signals in a process of transmitting or receiving information or a call. In particular, the RF circuit 810 receives downlink information from a base station, and transmits the downlink information to the processor 880, to be processed. Further, the RF circuit 810 transmits uplink data to the base station. Typically, the RF circuit 810 includes but is not limited to an antenna, at least one amplifier, a transceiver, a coupler, a low noise amplifier (LNA), a duplexer, etc. In addition, the RF circuit 810 may also communicate with a network and other devices through wireless communication. The above wireless communication may be performed by using any one communication standard or protocol including but not limited to Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), etc.

The memory 820 may be configured to store software programs and modules, and the process 880 performs various function applications and data processing of the cell phone by running the software programs and the modules stored in the memory 820. The memory 820 may mainly include a program storage area and a data storage area. The program storage area may store an operating system, an application program required for at least one function (such as a sound playing function and an image playing function), etc, and the data storage area may store the data (such as audio data and a phone book) created based on the use of the cell phone, etc. In addition, the memory 820 may include a high-speed random access memory, and may also include non-volatile memory, such as at least one magnetic disk storage device, a flash memory device, or other volatile solid state memory device.

The input unit 830 may be configured to receive inputted digital information or inputted character information, and generate key signal input related to user settings and function control of the cell phone. In particular, the input unit 830 may include a touch panel 831 and other input devices 832. The touch panel 831, also referred to as a touch screen, may collect a touch operation (for example, an operation on the touch panel 831 or in the vicinity of the touch panel 831 which is performed by the user through any suitable object or accessory such as a finger or a touch pen) performed by the user on the touch panel 831 or in the vicinity of the touch panel 831, and drive a corresponding connection device according to a preset program. Optionally, the touch panel 831 may include a touch detection device and a touch controller. The touch detection device detects a touch position of the user and a signal caused by the touch operation, and transmits the signal to the touch controller. The touch controller receives the touch information from the touch detection device, and converts the touch information into touch coordinates, transmits the touch coordinates to the processor 880, and receives and executes commands from the processor 880. In addition, the touch panel 831 may be implemented as various types such as resistance touch panel, a capacitive touch panel, an infrared touch panel and a surface acoustic wave touch panel. In addition to the touch panel 831, the input unit 830 may also include other input devices 832. In particular, the other input devices 832 may include but not limited to one or more of a physical keyboard, a function key (such as a volume control button and a switch key), a trackball, a mouse and a lever.

The display unit 840 may be configured to display information inputted by the user or information provided to the user and various menus of the cell phone. The display unit 840 may include a display panel 841. Optionally, the display panel 841 may be configured in the form of a liquid crystal display (LCD), an organic light-Emitting Diode (OLED), etc. Further, the touch panel 831 may cover the display panel 841. In a case that the touch panel 831 detects a touch operation on the touch panel 831 or in the vicinity of the touch panel 831, the touch panel 831 transmits the touch operation to the processor 880 to determine a type of the touch event. The processor 880 provides a corresponding visual output on the display panel 841 based on the type of the touch event. Although the touch panel 831 and the display panel 841 are two separate components to implement an input function and an output function of the cell phone, the touch panel 831 and the display panel 841 may be integrated to realize the input function and the output function of the cell phone in some embodiments.

The cell phone may also include at least one sensor 850 such as a light sensor, a motion sensor and other sensors. In particular, the light sensor may include an ambient light sensor and a proximity sensor, The ambient light sensor may adjust the brightness of the display panel 841 in accordance with the brightness of the ambient light, and the proximity sensor may turn off the display panel 841 and/or backlight when the cell phone is moved near to the ear. As one type of the motion sensor, an accelerometer sensor may detect magnitudes of acceleration in all directions (usually three axes), a magnitude and a direction of gravity at rest, which may be used into an application (such as vertical and horizontal screen switch, a related game, magnetometer attitude calibration) for recognizing an attitude of the cell phone, and functions (such as pedometer, percussion) related to vibration recognition, etc. A gyroscope, a barometer, a hygrometer, a thermometer, an infrared sensor and other sensors with which the cell phone may be configured are not described here.

The audio circuit 860, a speaker 861, a microphone 862 may provide an audio interface between the user and the cell phone. The audio circuit 860 may transmit received electrical signal converted from audio data to the speaker 861, and the speaker 861 converts the electrical signal to a sound signal to output. In another aspect, the microphone 862 converts the collected sound signal into an electrical signal, the audio circuit 860 receives the electrical signal and converts the electrical signal into audio data, and then the audio data is outputted to the processor 880 for processing. The processed data is sent to for example, another cell phone through the RF circuit 810, or the audio data is outputted to the memory 820 for further processing.

The WiFi adopts short distance wireless transmission technology, the cell phone may assist the users in sending and receiving e-mails, browsing a webpage and accessing a streaming media, etc through the WiFi module 870, thereby providing wireless broadband Internet access to the users. Although FIG. 8 shows the WiFi module 870, it is can be understood that the WiFi module 870 is not a necessary component of the cell phone and may be omitted as needed without changing the scope of the disclosure.

The processor 880, as a control center of the cell phone, connects various parts of the cell phone via various interfaces and lines. The processor 880 performs various functions of the cell phone and processes the data through running or executing software programs and/or modules stored in the memory 820 and calling the data stored in the memory 820, to monitor the whole cell phone. Optionally, the processor 880 may include one or more processing units. Preferably, an application processor and a modem processor may be integrated into the processor 880. The application processor mainly processes an operating system, a user interface and an application, etc. The modem processor mainly processes wireless communications. It can be understood that the above-described modem processor may not be integrated into the processor 880.

The cell phone further includes the power supply 890 (e.g. a battery) to supply power to various components, preferably, the power supply can be logically connected to the processor 880 through a power management system, thus achieving functions such as charge management, discharge management and power consumption management through the power management system.

Although not shown in FIG. 8, the cell phone may also include a camera, a Bluetooth module, etc., which are not described here.

In the embodiment of the present disclosure, the processor 880 in the terminal has a function of running program instructions to realize the flow of the above method. The flow of the above method may be implemented based on the hardware structure shown in FIG. 8. Additionally, it should be noted that other device which may need the application acceleration can also implement the flow of the above method, and it is not limited to the structure of the cell phone shown in FIG. 8.

In the embodiment, the structure shown in FIG. 2 and the class definition shown in FIG. 3 have the contents on TAO. The main component of the whole architecture (a database, an application layer, a user interface) of the TAO has its own characteristics. For example, in the server, the function of storing data in the database management system is realized by the Generis platform using dedicated Application Programming Interface (API), this layer is called as a persistence layer. At the top of the first layer, all functions specific to eTesting are implemented through the application layer programmed with Hypertext Preprocessor (PHP). More details about the TAO are not described here, and the definition of standards related to the TAO may be referred to obtain more information about the TAO.

It should be noted that the units in the device embodiment are only divided in accordance with the function logic, but it is not limited to the above division, as long as the corresponding functions can be realized. In addition, a name of each function unit is only intended to distinguish each other in convenience, and is not intended to limit the protection scope of the present disclosure.

It can be understood by those skilled in the art that all or a part of blocks in the method embodiments may be implemented by instructing hardware with a program. The program may be stored in a computer-readable storage medium, which may be a read-only memory, a magnetic disk or an optical disk.

The foregoing is only the preferred embodiments of the present disclosure, and the protection scope of the present disclosure is not limited thereto. Any modifications or substitutions, which are easily thought by those skilled in the art within the technical scope of the present disclosure, fall within the protection scope of the present disclosure. Thus, the protection scope of the present disclosure should consist with the protection scope of the disclosure and the claims.

What is claimed is:

1. An application acceleration method performed at a computer server having one or more processors and a memory storing one or more programs to be executed by the one or more processors, the method comprising:
    exposing, by a control center, an initialization interface and a deinitialization interface of the control center through a dynamic link library;
    invoking, by the control center, a process monitoring class to monitor start and end of a computing process of an application, after the initialization interface of the control center is invoked;
    triggering, based on determining that the computing process hits a configured process, a callback interface of the process monitoring class;
    sending, to the control center, by the process monitoring class via the callback interface, process information on the computing process;
    confirming, by the process monitoring class, that the computing process requires to be accelerated;
    receiving, by the control center, process information on the computing process sent by the process monitoring class after the process monitoring class monitors that the computing process is started and confirms that the computing process requires to be accelerated;
    invoking, by the control center, a service class based on the process information, wherein the service class includes a configuration file with information on a correspondence among the computing process, a plurality of states of the computing process, and a task executed in each of the plurality of states of the computing process;
    monitoring, by the service class, the plurality of states of the computing process;
    accelerating at least one of starting and running of the computing process, by the service class, via executing the task in each of the plurality of states of the computing process according to the configuration file until the computing process is in an end state.

2. The application acceleration method according to claim 1, wherein after the service class monitors that the computing process is in the end state, the application acceleration method further comprises:
    receiving, by the control center, information indicating that acceleration for the computing process is completed from the service class; and
    invoking, by the control center, the process monitoring class to monitor start and end of another computing process.

3. The application acceleration method according to claim 1, wherein, an execution result for the task comprises success or failure; and a type of the task comprises at least one of condition triggering, condition judgment and an action.

4. An application acceleration device, comprising a processor and a memory for storing program instructions, wherein the processor executes the program instructions to:
    expose, by a control center, an initialization interface and a deinitialization interface of the control center through a dynamic link library;

invoke a process monitoring class by the control center to monitor start and end of a computing process of an application, after the initialization interface of the control center is invoked;

trigger, based on determining that the computing process hits a configured process, a callback interface of the process monitoring class;

send to the control center, by the process monitoring class via the callback interface, process information on the computing process;

confirm, by the process monitoring class, that the computing process requires to be accelerated;

receive, by the control center process, information on the computing process sent by the process monitoring class after the process monitoring class monitors that the computing process is started and confirms that the computing process requires to be accelerated;

invoke a service class by the control center based on the process information, wherein the service class includes a configuration file with information on a correspondence among the computing process, a plurality of states of the computing process, and a task executed in each of the plurality of states of the computing process;

monitor, by the service class, the plurality of states of the computing process;

accelerate at least one of starting and running of the computing process by the service class via executing the task in each of the plurality of states of the computing process according to the configuration file until the computing process is in an end state, wherein a configuration file is stored in the service class.

5. The application acceleration device according to claim 4, wherein the processor executes the program instructions further to:

receive information indicating that acceleration for the computing process is completed from the service class after the service class monitors that the computing process is in the end state; and invoke the process monitoring class to monitor start and end of another computing process after it is received the information indicating that the acceleration for the computing process is completed.

6. The application acceleration device according to claim 4, wherein, an execution result for the task comprises success or failure; and a type of the task comprises at least one of condition triggering, condition judgment and an action.

7. A non-transitory computer storage medium comprising computer executable instructions that cause a processor to perform an application acceleration method, wherein the application acceleration method comprises:

exposing, by a control center, an initialization interface and a deinitialization interface of the control center through a dynamic link library;

invoking, by the control center, a process monitoring class to monitor start and end of a computing process of an application, after the initialization interface of the control center is invoked;

triggering, based on determining that the computing process hits a configured process, a callback interface of the process monitoring class;

sending to the control center, by the process monitoring class via the callback interface, process information on the computing process;

monitoring, by the process monitoring class, that a computing process is started;

confirming, by the process monitoring class, that the computing process requires to be accelerated;

sending, by the process monitoring class, process information on the computing process to the control center;

receiving, by the control center, the process information;

invoking, by the control center, a service class based on the process information, wherein the service class includes a configuration file with information on a correspondence among the computing process, a plurality of states of the computing process, and a task executed in each of the plurality of states of the computing process;

monitoring, by the service class, the plurality of states of the computing process based on the process information; and accelerating at least one of starting and running of the computing process, by the service class, via executing the task in each of the plurality of states of the computing process according to the configuration file until the computing process is in an end state.

* * * * *